United States Patent [19]

Tsumura et al.

[11] 4,421,606
[45] Dec. 20, 1983

[54] PROCESS FOR DISTILLING WATER

[75] Inventors: Kenji Tsumura, Nishinomiya; Masayuki Yamashita, Osaka, both of Japan

[73] Assignee: Oriental Metal Mfg. Co., Amagasaki, Japan

[21] Appl. No.: 315,236

[22] Filed: Oct. 26, 1981

Related U.S. Application Data

[62] Division of Ser. No. 129,740, Mar. 12, 1980, Pat. No. 4,329,205.

[30] Foreign Application Priority Data

Mar. 22, 1979 [JP] Japan .................................. 54-34051
Aug. 11, 1979 [JP] Japan ................................ 54-102576

[51] Int. Cl.³ ............................................. B01D 3/02
[52] U.S. Cl. ........................................ 203/10; 203/72; 203/89; 203/DIG. 1
[58] Field of Search ....................... 203/10, 11, 21, 71, 203/72, 89, DIG. 1, 100, 99, 22, 25, 27; 202/163, 232, 233–236; 159/49, 1 S, 1 W

[56] References Cited

U.S. PATENT DOCUMENTS

| | | |
|---|---|---|
| 3,275,530 | 9/1966 | Akers . |
| 3,735,793 | 5/1973 | Burberry et al. .................. 159/289 |
| 3,875,926 | 4/1975 | Frank .................................. 202/234 |
| 3,930,958 | 1/1976 | Maruichi . |
| 3,977,364 | 8/1976 | Gijsbers et al. ..................... 122/366 |
| 4,046,637 | 9/1977 | Sasaki . |
| 4,172,766 | 10/1979 | Laing et al. ........................ 202/234 |

*Primary Examiner*—Frank Sever
*Attorney, Agent, or Firm*—Armstrong, Nikaido, Marmelstein & Kubovcik

[57] ABSTRACT

A process and an apparatus for distilling water in which a heat receiving plate member and a plurality of cooling plate members have a means for holding water to be treated on each reverse side thereof and are arranged in parallel spaced relationship with each other, and the water vapor produced by heating the heat receiving surface of the heat receiving plate member is condensed on the condensing surface of the adjacent cooling plate member, while giving the latent heat of the condensation to the cooling plate member and heating a water held on its back to produce the water vapor which is condensed on the condensing surface of the next cooling plate member, such evaporation by the latent heat and condensation being conducted according the number of rooms partitioned by adjacent two cooling plate members. There are apparatuses of two types, i.e. thermal diffusion type and convection type, and they are availably employed for purifying impure water or desalting sea water in high heat efficiency by utilizing various heat sources such as solar heat.

3 Claims, 9 Drawing Figures

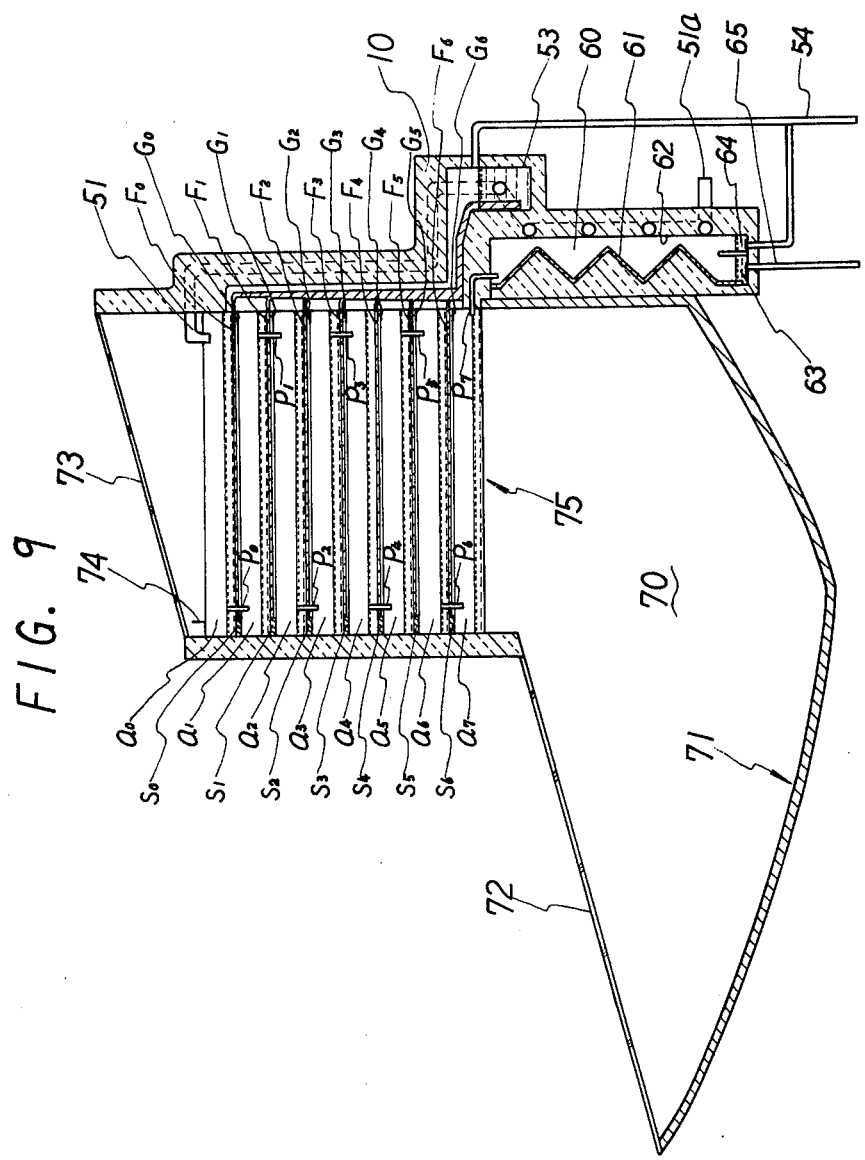

PROCESS FOR DISTILLING WATER

This is a division of application Ser. No. 129,740, filed Mar. 12, 1980 now U.S. Pat. No. 4,329,205.

BACKGROUND OF THE INVENTION

The present invention relates to a process for distilling water such as sea water.

Various distillation processes and apparatuses are known such as a multiple effect evaporator, a multistage flash evaporator and a solar distillation apparatus, and are availably employed for purifying impure water or desalting sea water.

A known distillation apparatus such as a multistage flash evaporator is complicated and large, and the heat efficiency is not so good. The evaporator has also the disadvantages that it is necessary to reduce pressure or to make vacuous, that a large mechanical energy is required for conveying upward and downward water to be treated or for passing the water through, for instance, spiral pipes, and that the maintenance cost comes expensive.

Solar distillation apparatuses hitherto used are classified roughly into a so-called basin type in which a heat collector and an evaporator are joined in a body and a so-called separate type in which a heat collector and an evaporator are separately installed. The basin type solar distillation apparatus is generally inferior in the heat efficiency, but the construction is simple. On the other hand, the separate type solar distillation apparatus is good in the heat efficiency, but the construction is complicated and the operation cost is expensive.

In general, a basin type solar distillation apparatus is composed of a basin filled with a waste water or sea water in the atmosphere and a transparent cover therefor. The basin is lined with a material such as butyl rubber which is water resistant and absorbs well solar radiation. A heat insulating material is also employed for decreased heat loss. A glass sheet and a weatherproofing clear plastic film are employed as the transparent cover, and the cover is installed with a slight gradient. The sunlight falls on the basin through the transparent cover and sea water so as to raise the temperature of sea water. When the temperature of sea water becomes higher than the surrounding atmospheric temperature by about 10° to 15° C., the evaporation becomes vigorous and the water vapor begins to circulate within the apparatus with air. The water vapor is condensed on the inner surface of the cover, and the water droplets run along the inner surface of the inclined cover to the side walls of the basin and is collected into a fresh water tank through a conduit. In such basin type solar distillation apparatus, the heat efficiency is less than 45% in summer when the highest efficiency is attained, and is about 30% on the average throughout the year. In order to improve the distillation efficiency, there have been proposed various basin type solar distillation methods and apparatuses, such as the use of a basin having a corrugated bottom to increase the evaporation area and the use of a water or brine cooling means for cooling a cover instead of air cooling, but they cannot raise the efficiency so high.

SUMMARY OF THE INVENTION

It is an object of the present invention to provide a process for distilling water in a high heat efficiency.

A further object of the invention is to provide an apparatus for distilling water, the structure of which is very simple.

A still further object of the invention is to provide a multi effect distillation apparatus having a high heat efficiency.

These and other objects of the invention will become apparent from the description hereinafter.

In accordance with the present invention, there is provided a process for distilling water which comprises heating one side of a heat receiving plate member, evaporating water to be treated which is held on the other side of said heat receiving plate member, condensing the resulting water vapor on a condensing surface of a cooling plate member which is the cooling plate member adjacent to said heat receiving plate member among a plurality of cooling plate members provided at a space to each other and in parallel with said heat receiving plate member, repeating the evaporation of water to be treated which is held on the opposite side of each cooling plate member to the condensing surface and the condensation of the resulting water vapor on the condensing surface of each cooling plate member, said evaporation being caused by the latent heat of said condensation, and collecting the condensed water.

The present invention also provides an apparatus for distilling water which comprises
 (a) a casing,
 (b) a heat receiving plate member for receiving heat on one side thereof and evaporating a water to be treated,
 (c) a plurality of cooling plate members for condensing the water vapor and evaporating a water to be treated by the latent heat of the condensation, said cooling plate members being arranged in parallel spaced relationship with said heat receiving plate member and with each other,
 (d) water holding means for holding said water to be treated on the other side of said heat receiving plate member and on one side of each of said cooling plate members, said each water holding means being opposite to the condensing surface of the adjacent cooling plate member,
 (e) a water supply means for suppying the water to be treated to said water holding means, and
 (f) a water collecting means for collecting the condensed water.

BRIEF DESCRIPTION OF THE DRAWINGS

FIG. 9 is a longitudinal section view of a convection type solar distillation apparatus showing a modification of the present invention.

DETAILED DESCRIPTION

Figure 1:
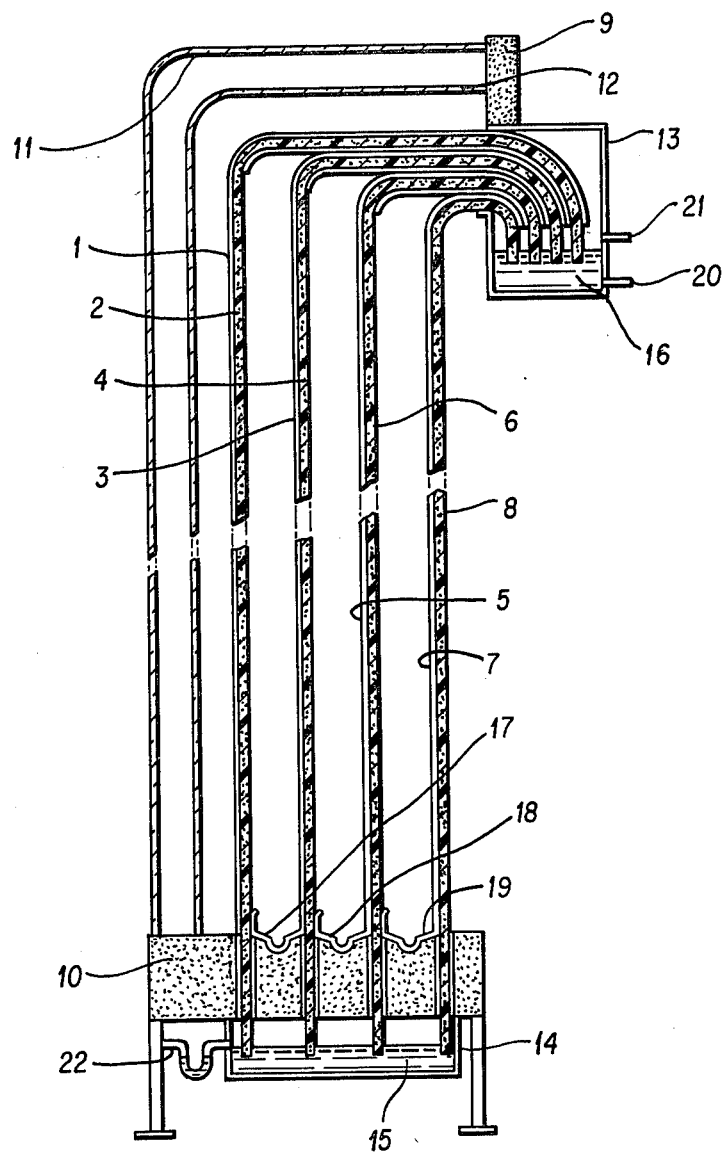
FIG. 1 is a schematic longitudinal section view of a solar distillation apparatus showing an embodiment of the present invention.

The present invention is applicable to purification of impure water such as an industrial waste water, a domestic waste water, an underground water or a liver water, and desalting of sea water.

In the present invention, heat is transferred by thermal diffusion or convection, and the process of the present invention is practiced by employing a multi effect distillation apparatus of a thermal diffusion type or a convection type. As a heat source, there may be employed various heat sources such as the sunlight, electric heat, fuel, steam, waste heat and hot water.

One embodiment of the present invention is thermal diffusion type solar distillation process and apparatus. A part of a casing of the apparatus is made up of a transparent cover through which the sunlight transmits and falls on a heat receiving plate member to cause it to heat and by which warmth inside the cover is also kept. A cooling plate member has a reflective surface on one side thereof, and the water vapor condenses thereon. A porous water-absorptive sheet is employed as a water holding means, and is attached to each of the back sides of the heat receiving plate member and the reflective cooling plate members with respect to the heat receiving surface and the condensing surfaces. The transparent cover, the heat receiving plate member and a plurality of the cooling plate members are arranged in that order in parallel spaced relationship with each other so that the porous water-absorptive sheet faces to the condensing surface of the cooling plate member. A water to be treated is absorbed by the porous sheets. The water absorbed by the porous sheet attached to the back side of the heat receiving plate member is heated by the heat receiving plate member to evaporate, and the evaporated water is condensed on the condensing surface of the cooling plate member facing the back side of the heat receiving plate member. The water absorbed by the porous sheet attached to this cooling plate member is heated and evaporated by the latent heat of the condensation and is then condensed on the condensing surface of another cooling plate member facing the porous sheet stuck to the preceding cooling plate member. In the same manner, evaporation of water and condensation of the resulting water vapor are repeated in order between the respective porous sheets and condensing surfaces opposite to each other. The porous sheet attached to the last cooling plate member located outside is cooled by the outside air, and also serves as a part of the casing.

By employing a heat receiving plate member having a high heat absorption property and a reflective cooling plate member having a high reflection property, the heat loss occurring at the porous sheet portions are prevented and a water to be treated is evaporated with a good efficiency, since the radiant heat from the porous sheets which are higher temperature parts is reflected by the reflective cooling plate members which are lower temperature parts. Also, since the temperature elevation of the reflective cooling plate members can be avoided by the reflection of the radiant heat (the reflective cooling plate members obtain only the latent heat of the condensation of the water vapor), the difference in temperature between the porous sheet and the cooling plate member facing each other can be maintained high, and as a result, the mist-like water vapor particles which have a specific gravity of 1 and is heavier than air, receive a force of moving from the porous sheet to the reflective cooling plate member by the separation action of the thermal diffusion effect, and quickly move to the cooling plate member and is condensed and separated on the reflective surface thereof to produce distilled water in an improved production efficiency.

The term "separation action of the thermal diffusion effect" as used herein means a diffusion phenomenon in which a lighter component in a mixed fluid of two components is attracted to a higher temperature side and a heavier component is attracted to a lower temperature side.

In a mixed gas of two components, thermal diffusion ratio $k_T$ is shown by the equation:

$$k_T = -dC_1/(\log T) = dC_2/d(\log T)$$

wherein $C_1$ is a molar fraction of a heavier component, $C_2$ is a molar fraction of a lighter component and T is absolute temperature, and the thermal diffusion has been utilized in separation of isotopes. In the present invention, a higher temperature portion (i.e. the porous water-absorptive sheet attached to the heat receiving plate member or the reflective cooling plate member) and a lower temperature portion (i.e. the reflective surface of the reflective cooling plate member) are opposite to each other and between them heavier fine liquid water particles and lighter molecules of air are present. Therefore, while the water vapor and air which are higher temperature and the liquid water particles and air which are lower temperature circulate upward and downward, respectively, by convection, simultaneously the liquid water particles are attracted toward the reflective cooling plate member and quickly condense on the reflective surface by the separation action of the thermal diffusion effect.

Since the process of the present invention is conducted by the multi effect system, the solar heat can be efficiently utilized. Of course, the process may be conducted by a system of one effect, that is, by employing a combination of a heat receiving plate member and a single reflective cooling plate member. If there is no heat loss, an approximately equal amount of distilled water is produced in each effect by a certain amount of solar energy and it is theoretically possible to infinitely produce distilled water. However, in practical production a production speed is required and, therefore, it is desired to maintain the difference in temperature between the higher temperature side (i.e. the porous water-absorptive sheet) and the lower temperature side (i.e. the reflective surface of the cooling plate member) facing each other about 5° to about 15° C. For instance, when the temperature of the heat receiving plate member is 90° C. and the temperature of the outer reflective cooling plate member is 30° C., it is practical to conduct the process by a system of 3 to 12 effects.

Figure 2:
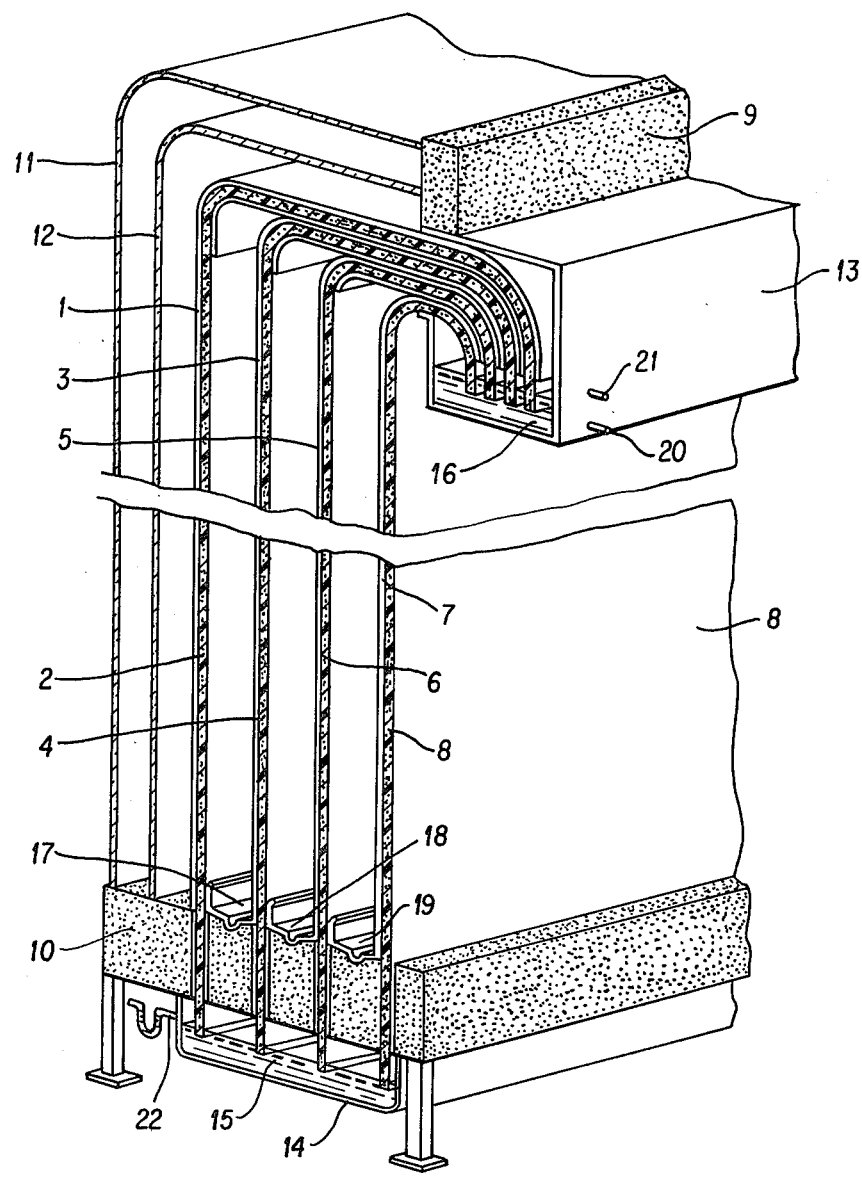
FIG. 2 is a partially cutaway perspective view of the apparatus shown in FIG. 1.

FIG. 1 is a longitudinal section view of a vertical type solar distillation apparatus showing an embodiment of the present invention in which two transparent covers for keeping warmth and three reflective cooling plate members are employed, and FIG. 2 is a partially cutway perspective view of the apparatus shown in FIG. 1. Numerals 11 and 12 are transparent covers for keeping warmth through which the sunlight transmits and falls on a heat receiving plate 1. Both ends of the covers 11 and 12 are attached to heat insulating frames 9 and 10. The transparent cover is located outside the heat receiving plate 1 in an appropriate space therefrom so as to prevent the heat energy loss of the plate 1 heated by the sunlight, and as shown in FIG. 1 the double cover is preferred than the single cover. The suitable materials as the transparent cover are a transparent glass plate and a transparent plastic board, sheet or film. Numerals 13 and 14 are upper and lower tanks of overflow type, and they are attached to the heat insulation frames 9 and 10, respectively. Porous water-absorptive sheets 2, 4, 6 and 8 are stuck to the reverse sides of the heat receiving plate 1 and reflective coating plates 3, 5 and 7. The cooling plates 3, 5 and 7 are located inside the heat receiving plate 1, and are arranged in parallel spaced relationship with the heat receiving plate 1 and with each other. The upper portions of the cooling plates to which the porous sheets are stuck are integrated in layers, and the integrated upper portions are inserted into an opening of the upper tank 13 so that the ends of the porous sheets are immersed into a water 16 to be treated in the tank 13. The lower end of the heat receiving plate 1 is attached to the frame 10. The lower ends of the cooling plates 3, 5 and 7 are in L-shaped and are attached to the frame 10 so as to form gutters 17, 18 and 19 for collecting the condensed water. It is desirable that the gutter has the width corresponding to the space between the porous sheet and the cooling plate. The ends of the porous sheets 2, 4, 6 and 8 extend through the heat insulating frame 10 to the lower tank 14 attached outside the frame 10 so as to be immersed into a water 15 to be treated in the tank 14.

The heat receiving plate 1 has a surface capable of absorbing radiant heat of sun. The heat receiving plate receives the sunlight and converts it into the heat energy so as to evaporate water absorbed by the porous sheet stuck onto the back of the heat receiving plate. For instance, as the heat receiving plate 1 there may be employed thin corrosion resistant metal plates (thickness of which is usually about 0.05 to about 1 mm.) having a black or dark heat receiving coating capable of selectively absorbing the solar heat rays in the wave length region of about 0.3 to about 2.5$\mu$. Such a heat receiving coating is formed by applying a coating composition containing a synthetic resin such as an alkyd resin, an urethane resin, an epoxy resin, a fluorine-containing resin or an acrylic resin and a filler such as carbon black, potassium chromate or strontium chromate onto the surface of the corrosion resistant metal plate such as stainless steel or aluminum. Also, a transparent plastic sheet or film is usable as the heat receiving plate 1. In that case, a black porous water-absorptive sheet is stuck to the back of the plastic sheet so that the sunlight transmits through the plastic sheet and directly hits the black porous water-absorptive sheet.

Although the solar heat absorbed by the heat receiving plate 1 is consumed to evaporate water, there may occur heat losses due to the convection of air, thermal radiation and thermal conduction by materials of apparatus. These heat losses raise the temperature of a lower temperature part and prevents the condensation of water vapor so as to lower the production yield of distilled water, though the convection of air may accelerate the evaporation of water. The heat loss due to the radiation is relatively large, and in order to prevent this heat loss a cooling plate having a reflective surface is preferably employed. Since the reflective surface of the cooling plate reflects 90 to 95% of the radiant heat and can prevent the heat loss due to the radiation, the yield of the distilled water can be remarkably increased.

The reflective cooling plate is required to have the following three functions. That is to say, it is necessary that the cooling plate makes the vapor water generated at a higher temperature part condense on the reflective surface and makes the condensed liquid water flow downward as distilled water, that the cooling plate reflects the radiant heat from a higher temperature part opposite thereto so as to prevent the cooling of the higher temperature part, in other words, so as to prevent the heat loss by radiation, and that the cooling plate receives the latent heat released by the condensation of water vapor and quickly conducts it to the porous water-absorptive sheet stuck to the back so as to heat and evaporate the water absorbed by the porous sheet. Suitable materials for the reflective cooling plate are metal plates having a good corrosion resistance and a good thermal conductivity such as stainless steel and aluminum and transparent plastic sheets or films having a vacuum metallized surface such as aluminum or silver. The thickness of the metal plate is usually from about 0.05 to about 1 mm., and it is desirable that the metal plate is finished to give a mirror surface or a smooth surface. Also, it is desirable that the vacuum metallized surface of the plastic sheet or film is protected with a transparent plastic coating to provide a water resistance and corrosion resistance. A corrugated reflective cooling plate may be employed for the purpose of increasing a heat absorption area, evaporation area, cooling area and strength.

As the porous water-absorptive sheet to be stuck to the back of the heat receiving plate and the back of the reflective cooling plate, there are employed those capable of drawing up a water to be treated by capillary action, e.g. hydrophilic felts, plastic foams having continuous bubbles, cloths and papers. A felt, foam and cloth made of polyvinyl formal have a good water-absorptivity, and are suitably employed in the present invention. Also, it is desirable that the porous water-absorptive sheet is durable for use for a long term without being changed in quality by a water to be treated such as sea water or a waste water and moreover has a good thermal conductivity. There are also employed papers, cloths and mats made of carbon fiber, glass fiber, an anti-corrosive metal fiber such as stainless steel, asbestos fiber or a mixture of these fibers as well as the above-mentioned materials.

The distances between the heat receiving plate and the cooling plate and between two adjacent cooling plates are usually selected from 2 to 50 mm., and thereby a good thermal diffusion effect can be attained. Also, the distances between the covers when two covers are used and between the cover and the heat receiving plate are usually selected from 10 to 30 mm.

A water 16 to be treated is supplied through a feed pipe 20 to the upper tank 13, while overflowing through an overflow pipe 21, and is continuously absorbed by the porous water-absorptive sheets 2, 4, 6 and 8 stuck to the reverse sides of the heat receiving plate 1 and the reflective cooling plates 3, 5 and 7. Direct and scattering rays of the sun from the sky and reflected sunlight from the ground or the surface of the sea transmit through the transparent covers 11 and 12 and fall on the heat receiving plate 1, and the solar heat is absorbed thereby. The sunlight hitting the dark surface causes it to heat and evaporates the water absorbed by the porous sheet 2 stuck to the back of the heat receiving plate 1. The space between the porous sheet 2 and the adjacent cooling plate 3 opposite thereto is filled with the water vapor in the state of saturation. Since the temperature of the cooling plate 3 is lower than that of the porous sheet 2 stuck to the heat receiving plate 1, a part of the saturated water vapor is cooled below the dew point, and becomes very fine mist-like water particles which are then drawn toward to reflective surface of the cooling plate 3 by the thermal diffusion action and condensed on the reflective surface. The dewdrops run down and are collected as distilled water by the collecting gutter 17. Simultaneously the reflective surface of the cooling plate reflects the radiant heat from the porous sheet facing the reflective surface to prevent the heat loss by radiation.

The reflective cooling plate 3 obtains the latent heat of the condensation, and heats and evaporates the water absorbed by the porous sheet 4 stuck to the back of the cooling plate 3. The water vapor condenses on the reflective surface of the cooling plate 5 and the water droplets run down to the collecting gutter 18 in the same manner as in the first effect partitioned by the heat receiving plate 1 and the reflective cooling plate 3. The evaporation of water by the latent heat and the condensation of water vapor are repeated in each effect partitioned by two reflective cooling plates according to the number of the effects. The reflective cooling plate in the last effect is always maintained low temperature. That is to say, in FIGS. 1 and 2, the water for cooling absorbed by the porous sheet 8 stuck to the back of the reflective cooling plate 7 is evaporated by means of the outside air, and the cooling plate 7 is sufficiently cooled by the heat of vaporization. This also makes the reflective cooling plates 3, 5 and 7 maintain a constant temperature difference from each other, and they are in equilibrium state.

Although the number of the effects may be increased by employing a large number of the reflective cooling plates, there is a certain limit in the number of the cooling plates, since the yield of distilled water is reduced when the temperature difference between the adjacent two reflective cooling plates becomes too small.

When a water to be treated is sea water, sea water contained in the porous sheets concentrates and the concentration of salt increases with the evaporation of sea water. However, the salt naturally diffuses into the sea water flowing in the upper and lower tanks 13 and 14 not so as to increase over a certain concentration, and is maintained in equilibrium state.

The water supply to the porous sheets may be conducted from both the upper and lower tanks 13 and 14, or from either the upper tank 13 or the lower tank 14 by the capillary action. In case that the height of the apparatus is large and sufficient supply of a water to be treated, e.g. sea water, from the lower tank is difficult, the water may be supplied from only the upper tank 13 and the concentrated water may be discharged to the lower tank 14. In that case, since the water discharged to the tank 14 is hot, it may be employed to increase the heat efficiency by passing it from an overflow pipe 22 into a heat exchanger (not shown) and supplying a feed water heated by the heat exchanger to the upper tank 13 through the pipe 20. Also, it is possible to pre-heat the feed water by means of a heater such as a solar heater or by utilizing other waste heat. When the pre-heated water is supplied to the apparatus, the yield of distilled water approaches the theoretical value and, therefore, it is possible to increase the amount of the produced distilled water according to the increased number of the reflective cooling plates, in other words, of the effects. The solar heat absorbed by the heat receiving plate causes water to evaporate, and while the water vapor condenses on the reflective surface to produce distilled water, it causes water held on the back of the cooling plate to evaporate so as to produce on the reflective surface of the next cooling plate an approximately equal amount of distilled water to the distilled water produced on the preceding reflective cooling plate. On the succeeding every reflective cooling plate, an approximately equal amount of distilled water to the distilled water produced on the preceding cooling plate is produced in the same manner.

Figure 3:
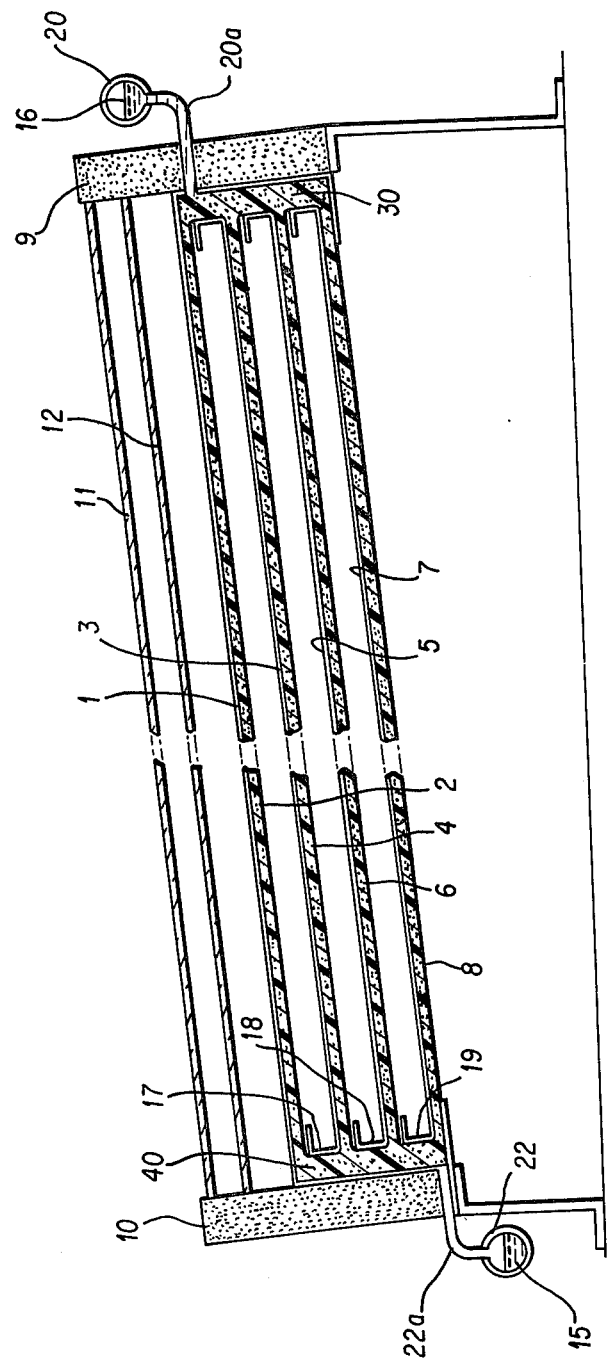
FIG. 3 is a schematic longitudinal section view of a solar distillation apparatus showing a modification of the present invention.
Figure 4:
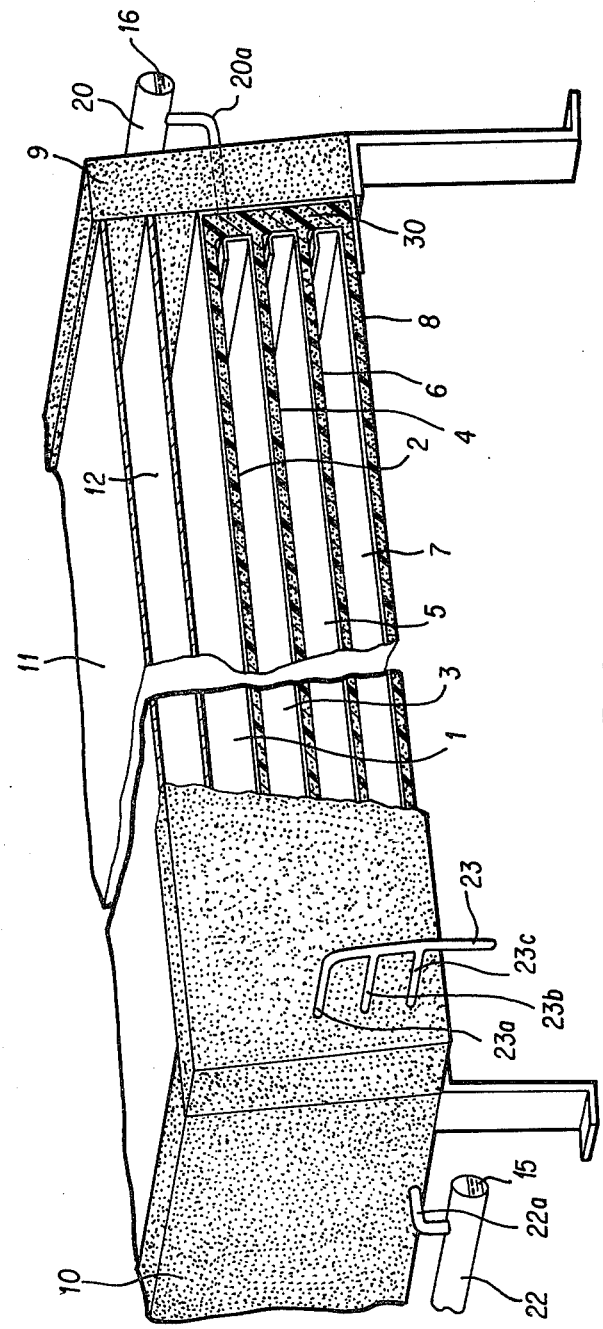
FIG. 4 is a partially cutway perspective view of the apparatus shown in FIG. 3.

FIGS. 3 and 4 show a solar distillation apparatus of inclination type according to the present invention. The transparent covers 11 and 12, heat receiving plate 1 and reflective cooling plates 3, 5 and 7 are arranged in that order in parallel with each other, and both ends of the covers 11 and 12 and the heat receiving plate 1 are attached to the heat insulating side walls 9 and 10. The upper ends of the porous water-absorptive sheets 2, 4, 6 and 8 stuck to the reverse sides of the plates 1, 3, 5 and 7 are connected to a porous water-absorptive thick sheet 30 for distributing a water to be treated which is provided inside the side wall 9, and the lower ends thereof are connected to a porous water-absorptive thick sheet 40 for recovering the distilled water which is provided inside the side wall 10. A water 16 to be treated is supplied from a feed pipe 20 to the distributing porous thick sheet 30 through a pipe 20a, and is evaporated from the porous sheets 2, 4, 6 and 8 with moving downward, while it is continuously supplied according to the evaporated amount. The water vapor condenses on the reflective surface of the cooling plates 3, 5 and 7. The condensed water runs down to the bottom portions 17, 18 and 19 of the reflective cooling plates along the reflective surfaces, and is collected as pure water through pipes 23a, 23b and 23c provided at the bottom portions 17, 18 and 19 and then through a pipe 23. The supplied excess water permeates into the recovering porous thick sheet 40 connected with the lower ends of the porous sheets 2, 4, 6 and 8, and is led to a pipe 22 through a pipe 22a.

Figure 5:
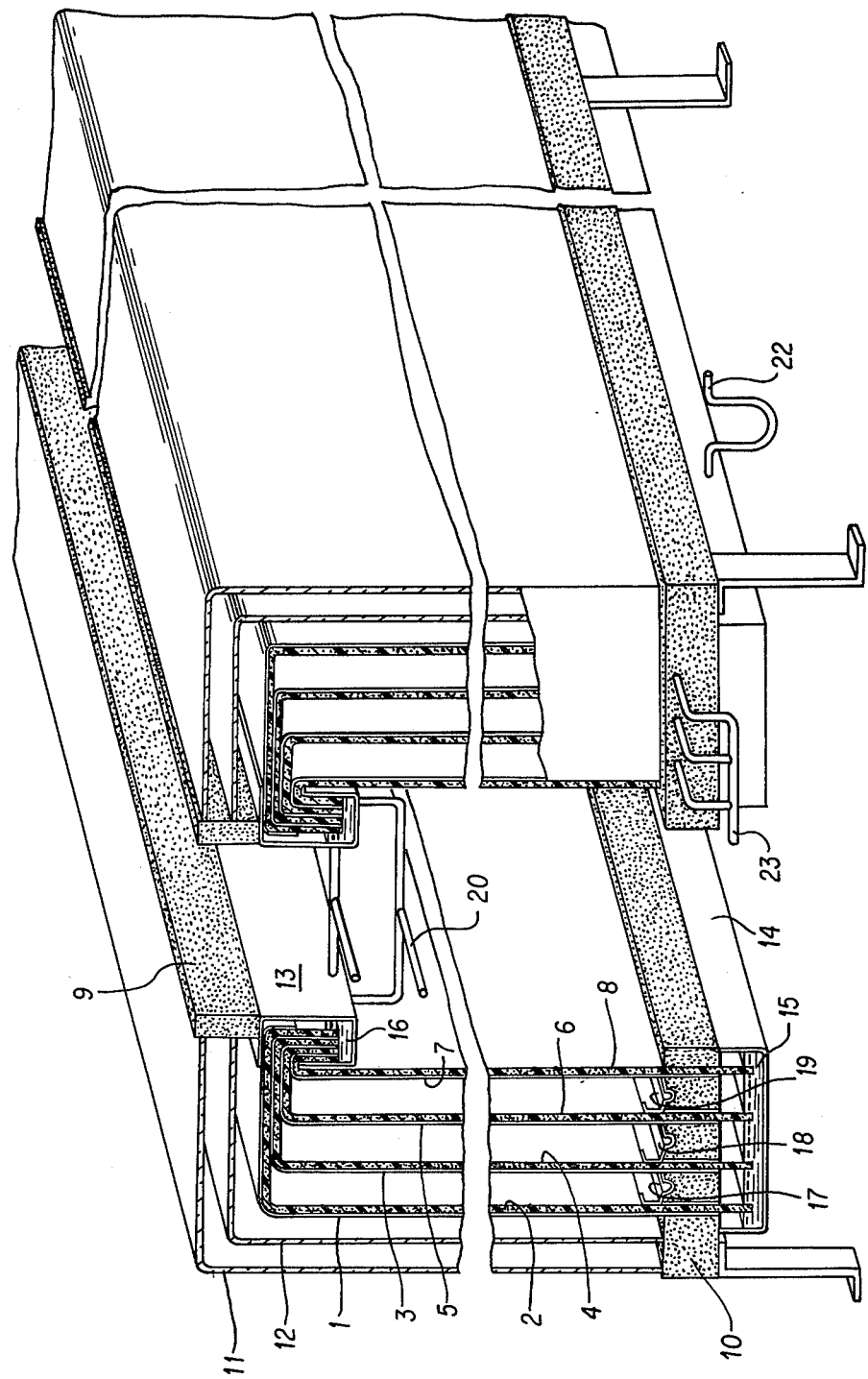
FIG. 5 is a partially cutway perspective view of a solar distillation apparatus showing another modification of the present invention.

In FIG. 5 wherein the reference numerals are the same as those in FIGS. 1 and 2 and the reference numeral 23 is a pipe for recovering distilled water, two vertical type solar distillation apparatuses as shown in FIGS. 1 and 2 are installed in parallel spaced relationship with each other, and the back side of one apparatus and the back side of the other apparatus stand opposite to each other. A reflector may be employed to increase the yield of distilled water, since the heat receiving plate positioned at the shady side is exposed to the scattering rays of the sun, but not exposed to the direct rays of the sun.

Figure 6:
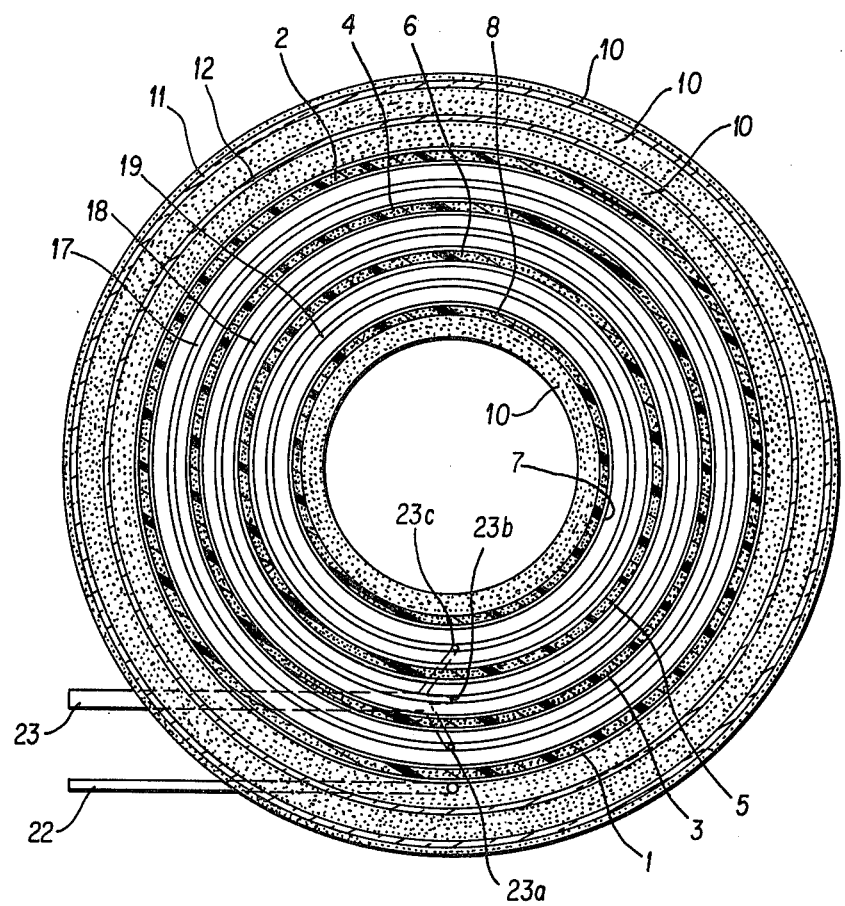
FIG. 6 is a cross section view of a cyrindrical solar distillation apparatus showing still another modification of the present invention.

FIG. 6 shows a cylindrical solar distillation apparatus according to the present invention, the body of which is a round shape in section. The transparent covers 11 and 12, heat receiving plate 1 and reflective cooling plates 3, 5 and 7 are concentrically arranged in that order from the outside, and the bottoms thereof are fixed to a heat inslating base 10. The porous water-absorptive sheets 2, 4, 6 and 8 are stuck to the inner sides of the heat receiving plate 1 and the cooling plates 3, 5 and 7. A water to be treated is supplied to the upper tank through the feed pipe. Gutters 17, 18 and 19 are provided at the bottoms of and in front of the reflective cooling plates 3, 5 and 7, and the condensed water is collected through the pipes 23a, 23b and 23c connected to the gutters 17, 18 and 19 and is recovered from the pipe 23 connected to the pipes 23a, 23b and 23c. The numeral 22 is an overflow pipe which is connected to the lower tank (not shown). The apparatus of this type is compact and can be easily set up, and also has the advantages that a small area for setting up is sufficient and the efficiency is good. The direct and scattering rays of the sun fall onto the heat receiving plate from all directions and causes water to evaporate, whereas the cyrindrical space at the center portion (to which the porous sheet 8 is exposed) is cooled by means of air cooling or water cooling, so distilled water can be produced in a high yield.

The solar distillation apparatus of the present invention is suitably employed for desalting sea water or for producing water fit to drink or water for agriculture from an industrial waste water, a domestic waste water or an underground or liver water containing salts or impurities.

The solar distillation apparatus of the present invention can produce distilled water in an amount of more than 10 times that produced by a conventional basin type solar distillation apparatus with respect to an equal amount of solar energy, and the heat efficiency is very high. The yield of distilled water may be further increased by compulsorily blowing the outside air to the porous water-absorptive sheet which is stuck to the back of the last reflective cooling plate and is exposed to the outside air so as to be cooled by the contact with the outside air or the evaporation of water. In case of desalting sea water on the sea, the efficiency may be further increased, when a cold sea water drawn from the sea bottom is used as a cooling water.

In addition to the solar heat, it is possible to utilize a waste heat as the heat source by bringing the heat of the earth or a hot water or air of a relatively low temperature discharged from a power plant or a factory into contact with the heat receiving plate, and new water resources may be developed by effectively utilizing a waste energy.

Figure 7:
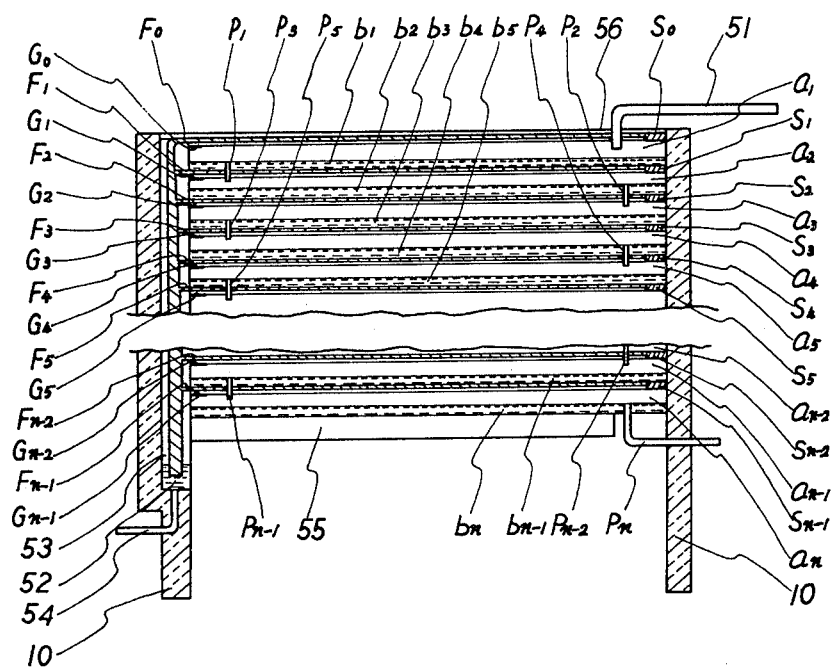
FIG. 7 is a schematic longitudinal section view of a convection type distillation apparatus showing another embodiment of the present invention.
Figure 8:
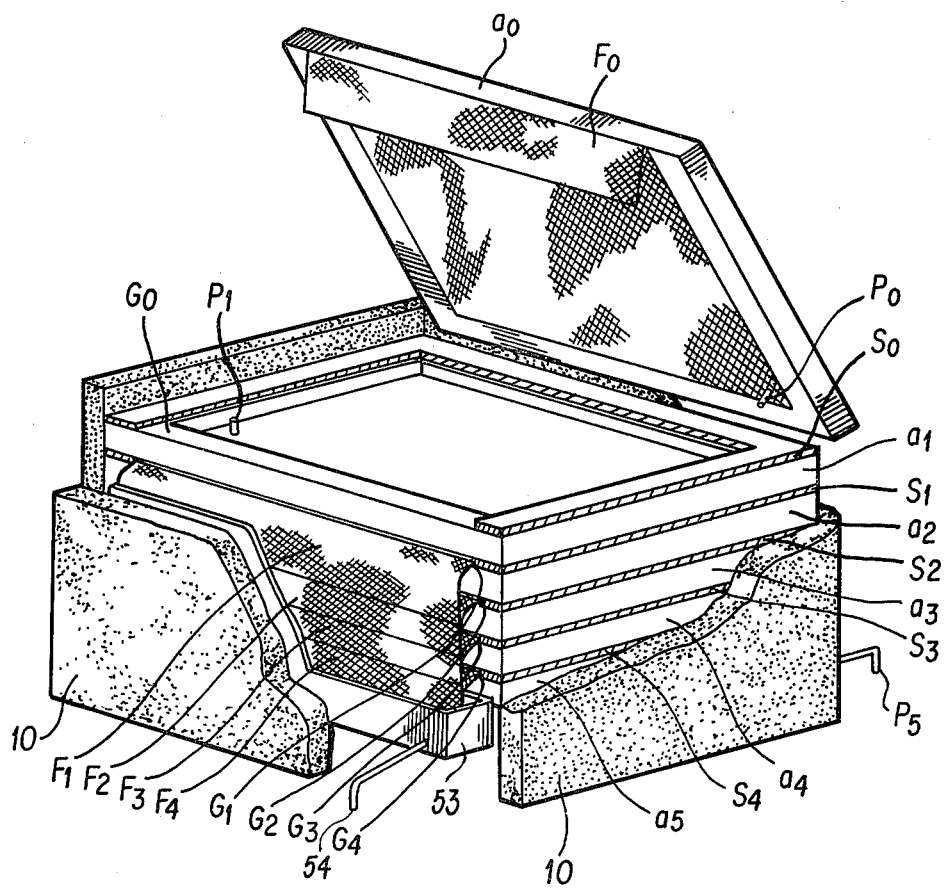
FIG. 8 is a partially cutway perspective view of a convection type distillation apparatus showing the state of being disassembled.

Another embodiment of the present invention is a convection type multi effect distillation apparatus as shown in FIGS. 7 to 9. In the apparatus of this type, a plurality of shallow dish-like vessels, e.g. several pieces to several tens pieces of the vessels, are put in layers to form a multi stage structure body. While a water to be treated is held in the vessels, the under surfaces of the bottoms of the vessels act as a cooling plate member and the water vapor is condensed thereon. The water supplied from a water supply means to the top vessel overflows to the next under vessel and eventually reaches the lowest vessel through overflow pipes attached to the vessels. The water in the lowest vessel is heated, for instance, to near boiling temperature, by a heating means such as a heater attached to the under surface of the lowest vessel in contact therewith or by means of the sunlight reflected or gathered to heat the bottom of the lowest vessel which acts as the heat receiving plate member. The water vapor generated in the lowest vessel is condensed on the under surface of the adjacent upper vessel, while giving the latent heat of the condensation to the bottom of the adjacent upper vessel and causing the water in the adjacent upper vessel to heat and evaporate so as to generate the water vapor corresponding to the vapor pressure at the temperature of the heated water. This water vapor was then condensed on the under surface of the adjacent upper vessel, while giving the latent heat of the condensation to the bottom of the adjacent upper vessel. Such evaporation and condensation are repeated in each effect partitioned by a lower vessel and an upper vessel. The heat given to the lowest vessel transfers in order from a lower vessel to an upper vessel by convection in the upward direction, in other words, in a contrary direction of the flow of the water to be treated. The temperature of the water in each effect is in a stationary state. If there is no heat loss, it is theoretically possible to infinitely produce distilled water by a certain limited heat energy. However, in practical production a production speed is required and, therefore, it is desired to maintain the difference in temperature between a higher temperature part (i.e. a water to be treated in a lower vessel) and a lower temperature part (i.e. a water to be treated in the next upper vessel) usually by about 4° to about 10° C. For instance, when the temperature of the water in the lowest vessel is 95° C. and the temperature of the water in the top vessel is 55° C., it is practical to conduct the process by a system of 5 to 10 effects.

The condensed water on the under surface of the bottom of each vessel is taken out as distilled water. The top vessel may be covered with a cooling plate cooled by means of air cooling so that the water vapor evaporated from the top vessel is conducted on the under surface of the cooling plate as distilled water which is then taken out. Of course, the top vessel filled with water may be employed for cooling the water vapor generated from the adjacent lower vessel. U-shaped packings are interposed between respective adjacent two vessels so as to form slit openings for taking out the condensed water which is then collected into a pure water gutter. Although the under surface of the bottom of the dish-like vessel may be horizontal, it is preferably inclined at an angle of 2° to 10°, particularly 3° to 5° with respect to a horizontal plane, since the condensed water is made easily flow out along the under surface. This may be attained by means of the packings interposed between the vessels, the formation of the bottom of the vessel in the inclined plane or installation of the apparatus with a gradient.

In either case of making the under surface of the bottom of the vessel horizontal or inclining it, porous water-absorptive sheets may be stuck to all over the under surface of each bottom of the vessels, and by which the condensed water is absorbed without dropping into the adjacent lower vessel. Also, it is desirable that the porous sheets extend through the slit openings to the outside of the evaporation system, preferably to the pure water collecting gutter located below the slit opening of the lowest vessel. The condensed water absorbed by the porous sheets flows out from the evaporation system by capillary action and then runs down to the gutter by capillary action and siphon action. Since the condensed water absorbed by the porous sheet at the under surface of the bottom of the upper vessel forms a water layer, it becomes a good conductor of heat and the water vapor condenses very easily on the surface of the porous sheet, while giving the latent heat of the condensation to the next upper vessel so as to heat and evaporate the water. Examples of the porous water-absorptive sheet are a cloth or felt made of a hydrophilic fiber such as polyvinyl formal fiber, polyamide fiber or cellulose fiber, a cloth or non-woven fabric made of glass fiber, carbon fiber or asbestos, and a hydrophilic sheet made of a synthetic resin foam such as urethane foam incorporated with graphite. A cloth and felt made of a hydrophilic fiber are preferred. The thickness of the porous sheet is selected from 0.1 to 10 mm., preferably 1 to 3 mm. according to the area of the condensing surface and the amount of the condensed water. The porous sheet may be stuck to the under surface of the bottom of the vessel by applying an adhesive having a water resistance and a heat resistance such as an acrylic adhesive or an epoxy adhesive to all over the under surface, to the under surface at regular intervals, or to the corners of the under surface and sticking the porous sheet thereto. The adhesive is desirably applied to the under surface at regular intervals or to the corners in viewpoint of the heat conductivity. In case that the vessel having a corrugated bottom is employed, the adhesive is desirably applied to the depressed portions of the corrugated under surface.

The size of the dish-like vessel is usually 300 to 1,000 mm. in length and 500 to 2,000 mm. in width. The height of the vessel is preferably selected from the range of 10 to 100 mm., and thereby the concentration of a water to be treated is maintained constant and also the temperature difference between a lower vessel and the adjacent upper vessel is made as small as possible and the heat transfer and the production of the condensed water are increased so that the number of the stages may be increased and the heat efficiency may be increased. The suitable materials for the dish-like vessel are a coated metal such as aluminum, cupper, iron or steel, and an anti-corrosive metal such as stainless steel or titanium. The anti-corrosive stainless steel and titanium and an alloy thereof are preferably employed. The depth of the water held in the vessel is usually 10 to 50 mm., and accordingly an overflow pipe is attached to the vessel so that the depth of the water falls within the above range.

The slit opening for taking out the condensed water is formed by interposing the U-shaped packing between the adjacent two vessels. The width of the slit opening in the longitudinal direction is from 1 to 10 mm., preferably 2 to 3 mm. In case of employing the porous water-absorptive sheet, the longitudinal width of the slit opening is adjusted by changing the thickness of the packing with taking the thickness of the porous sheet into consideration.

The feed amount of a water to be treated is adjusted so that the water is discharged from the overflow pipe attached to the lowest vessel in an amount of 1 to 3 liters/hours/m$^2$. Suitable feed amount is about 2 to about 3 times the amount of the distilled water collected, and with the supply of the water in such a ratio the pure water is produced in a good heat efficiency without causing the deposit of a scale.

Supposing that the amount of the heat given to the water to be treated in the lowest vessel is Q calories and there is no heat loss, all the given heat Q is consumed by the evaporation of the water. Supposing that the latent heat of the condensation of the water vapor is L calories/kg., the amount of the distilled water produced in each effect is Q/L kg. If the number of the stages, i.e. the effects, of the apparatus is n, total amount of the produced distilled water is Q/L X n kg. However, in practice, a part of the heat is taken away by the condensed water and the discharged overflowing water from the lowest vessel and is also lost by the heat conduction through the apparatus materials. Therefore, in order to decrease the heat loss and to efficiently produce distilled water, the multi stage structure body is preferably covered with a heat insulating material. Also, it is desirable to recover the heat of condensed water and the discharged water by means of a heat exchanger so as to heat the supplied water to be treated.

Now referring to FIG. 7 showing a convection type multi effect distillation apparatus according to the present invention wherein porous water-absorptive sheets are stuck to the under surfaces of the bottoms of dish-like vessels and they extend to a pure water collecting gutter through slit openings, the numerals $a_1$, $a_2$, $a_3$, $a_4$, $a_5 \ldots a_{n-2}$, $a_{n-1}$ and $a_n$ are dish-like vessels for holding a water to be treated and they are horizontally piled up in the state that U-shaped packings $S_1$, $S_2$, $S_3$, $S_4$, $S_5 \ldots S_{n-2}$ and $S_{n-1}$ are interposed between them to form slit openings $G_0$, $G_1$, $G_2$, $G_3$, $G_4$, $G_5 \ldots G_{n-2}$ and $G_{n-1}$. Porous water-absorptive sheets $F_1$, $F_2$, $F_3$, $F_4$, $F_5 \ldots F_{n-2}$ and $F_{n-1}$ are adhered with an adhesive to the under surfaces of the bottoms of the vessels, and extend through the slit openings to a condensed water collecting gutter 53 located below the slit opening $G_{n-1}$ of the lowest vessel $a_n$ so as to immerse in a distilled water 52 collected in the gutter 53. Three side walls except the side where the slit openings are located, which are formed by the side walls of the vessels and the packings, are covered with a heat insulating material 10, and the slit opening side is covered with the heat insulating material 10 with leaving a space between them so that the porous water-absorptive sheets hang down to the gutter 53 located at the bottom of the space.

A water to be treated is continuously supplied from a water feed pipe 51 to the top vessel $a_1$ in a prescribed amount, and the water $b_1$ filed in the vessel $a_1$ overflows through an overflow pipe $P_1$ into the vessel $a_2$. In the same manner, waters $b_2$, $b_3$, $b_4$, $b_5 \ldots b_{n-2}$ and $b_{n-1}$ in the vessels $a_2$, $a_3$, $a_4$, $a_5 \ldots a_{n-2}$ and $a_{n-1}$ overflow through overflow pipes $P_2$, $P_3$, $P_4$, $P_5 \ldots P_{n-2}$ and $P_{n-1}$ to respective next lower vessels, and water $b_n$ in the lowest vessel $a_n$ is discharged through an overflow pipe $P_n$. The overflow pipes are attached to the bottoms of the vessels and project through the bottom to a desired height. The overflow pipes of the adjacent two vessels locate at the end portions of the sides different from each other. The water $b_n$ held in the lowest vessel $a_n$ is heated to about 100° C. by a heater 55 attached to the bottom of the vessel $a_n$ in contact with the under surface of the bottom. Electric heat, a fuel, steam, a waste heat and a hot water are usable as a heat source for the heater 55. The resulting water vapor condenses on the porous sheet $F_{n-1}$ stuck to the under surface of the bottom of the next upper vessel $a_{n-1}$, and simultaneously release the latent heat of the condensation so as to heat the water $b_{n-1}$ in the vessel $a_{n-1}$. The liquid water condensed on the porous sheet $F_{n-1}$ is absorbed by the porous sheet $F_{n-1}$, and moves to the outside of the evaporation system and runs down to the condensed water collecting gutter 53 by capillary and siphon actions. The distilled water 52 in the gutter 53 is taken out through a pipe 54. The water $b_{n-1}$ in the vessel $a_{n-1}$ heated by the latent heat of the condensation generates the water vapor, and the water vapor condenses on the porous sheet $F_{n-2}$ stuck to the under surface of the bottom of the next upper vessel $a_{n-2}$ with heating the water $b_{n-2}$ in the vessel $a_{n-2}$ by the latent heat of the condensation. In the same manner, heat exchange is conducted in order between the water vapor generated from the water to be treated in a lower vessel and the water to be treated in the adjacent upper vessel to produce distilled water. The water vapor generated from the water $b_1$ in the top vessel $a_1$ condenses on porous water-absorptive sheet $F_0$ stuck to a cooling plate 56 which is superposed on the top vessel $a_1$ with interposition of a packing $S_0$. The latent heat released at that time radiates to air. The waters condensed on the porous sheets $F_{n-1}$, $F_{n-2}$ ... $F_5$, $F_4$, $F_3$, $F_2$, $F_1$ and $F_0$ are absorbed by the porous sheets, and run down to the gutter 53 through the porous sheets by capillary and siphone actions. The collected distilled water 52 is taken out through the pipe 54 and stored in a tank (not shown).

FIG. 8 is a partially cutway perspective view of a convection type multi effect distillation apparatus showing the state that the apparatus is disassembled. Six shallow dish-like vessels $a_0$, $a_1$, $a_2$, $a_3$, $a_4$ and $a_5$ are horizontally piled up with interposition of U-shaped packings $S_0$, $S_1$, $S_2$, $S_3$ and $S_4$ to form an apparatus body. Porous water-absorptive sheets $F_0$, $F_1$, $F_2$, $F_3$ and $F_4$ are stuck with an adhesive to the respective under surfaces of the bottoms of the vessels. Slit openings $G_0$, $G_1$, $G_2$, $G_3$ and $G_4$ are formed on one side of the body by the interposition of the U-shaped packings, and through which the porous sheets stuck to the under surface of the vessels extend and hang down to a condensed water collecting gutter 53 positioned below the slit opening $G_4$ of the lowest vessel $a_5$. The distilled water collected in the gutter 53 is taken out through a pipe 54. The reference numerals $P_0$, $P_1$ and $P_5$ are overflow pipes attached to the bottoms of the vessels $a_0$, $a_1$ and $a_5$ through holes provided at the bottoms. The four sides of the apparatus body are covered with a heat insulating material 10.

FIG. 9 is a longitudinal section view of an embodiment of the convection type multi effect distillation apparatus according to the present invention, in which the sunlight is employed as a heat source and the apparatus is provided with a sunlight gathering box as a heater under the lowest dish-like vessel and an inclined transparent glass plate as a cover operating as a basin type evaporator over the top dish-like vessel. The sunlight gathering box 70 is made of aluminum mirror plates 71 having a good reflectivity to provide an reflective inner wall surface. The bottom of the box 70 is finished to a spherical surface, a parabolic surface of the combined surface thereof, and the inner side walls of the box 70 is finished to a flat surface. The sunlight transmitting through a transparent glass window 72 is gathered to the under surface 75 of the bottom of the lowest vessel $a_7$ by the mirror plates 71. The under surface 75 of the bottom of the lowest vessel $a_7$ is a surface capable of absorbing the solar heat rays, and a solar heat absorptive coating is usually applied to the under surface 75. Since the coating absorbs most of the heat of the gathered sunlight and scarcely emits radiant rays of itself, the efficiency of absorbing heat is very good. The solar heat absorptive coating is usually formed by applying a black or dark paint of a synthetic resin such as an alkyd resin, a urethane resin, an epoxy resin or an acrylic resin incorporated with a filler such as carbon black, potassium chromate or strontium chromate to the under surface 75 of the bottom of the lowest vessel $a_7$. Such a coating can selectively absorb the solar heat rays within the wave range of 0.3 to 2.5$\mu$.

Dish-like vessels $a_0$, $a_1$, $a_2$, $a_3$, $a_4$, $a_5$, $a_6$ are horizontally put in stages with interposition of U-shaped packings $S_0$, $S_1$, $S_2$, $S_3$, $S_4$, $S_5$ and $S_6$. Porous water-absorptive sheets $F_0$, $F_1$, $F_2$, $F_3$, $F_4$, $F_5$ and $F_6$ are stuck with an adhesive to the under surface of the bottoms of the vessels, and extend through slit openings $G_0$, $G_1$, $G_2$, $G_3$, $G_4$, $G_5$ and $G_6$ formed by the interposition of the packings between the vessels to a condensed water collecting gutter 53 located below the slit opening $G_6$ of the lowest vessel $a_7$. The water vapor generated in each vessel condenses on the porous sheet stuck to the under surface of each vessel, and is collected into the gutter 53. Overflow pipes $P_0$, $P_1$, $P_2$, $P_3$, $P_4$, $P_5$ and $P_6$ are attached to the bottoms of the vessels through holes made in the bottoms. An overflow pipe $P_7$ is attached to the side wall of the vessel $a_7$, and a water to be treated overflowing from the overflow pipe $P_7$ is introduced to a usual contact type heat exchanger 60 and is discharged through a pipe 65.

An inclined cover 73 of a transparent glass plate is provided over the top vessel $a_0$ to form a basin type evaporator. The sunlight transmitting through the transparent cover 73 causes a water supplied into the top vessel $a_0$ from a water feed pipe 51 to heat and evaporate, and the water vapor condenses on the under surface of the cover 73. The condensed water runs down along the under surface of the cover 73 and is collected into a condensed water collecting gutter 74.

A water to be treated is first supplied to a water feed pipe 51a and is preheated by the heat exchanger 60 in which the heat exchange is conducted between the water of a high temperature overflowing from the pipe $P_7$ and the supplied water. The preheated water is further preheated by a hot distilled water collected in a condensed water collecting gutter 53 which operates as a heat exchanger, and then supplied through the feed pipe 51 to the top vessel $a_0$ which operates as a basin type evaporator. In the heat exchanger 60, a water of a high temperature discharged from the overflow pipe $P_7$ runs down along a felt 61 for evaporation with generating the water vapor, and the water which has grown cold by the evaporation is collected in a drainage collecting vessel 63 and is discharged from a pipe 65. The water vapor generated from the felt 61 is cooled by the feed pipe 51a through which a water to be treated passes, and is condensed on a condensing surface 62. The condensed water is collected into a condensed water collecting vessel 64 and is taken out as distilled water from a pipe 54.

The convection type multi effect distillation apparatus according to the present invention is very simple in structure, and also does not require energy for operating the apparatus, since the gravity due to a head is utilized for the transportation of a liquid and since the operation is conducted at atmospheric pressure and there is no need for reducing pressure. Further, the heat conduction, heat exchange and condensation of the water vapor are effectively conducted based on the multi stage structure of the piled vessels without requiring a particular device. Therefore, since there is no moving portion and the apparatus is of fixing type, no trouble takes place. Moreover, the heat efficiently is very high, and for instance, it is possible to attain the heat efficiency of 20 times that of a conventional basin type solar distillation apparatus. Therefore, distilled water can be produce in an amount of about 5 to about 20 times that produced by a conventional distillation apparatus with respect to an equal amount of heat energy.

The present invention is more particularly described and explained by means of the following Examples.

These examples are intended to illustrate the invention and not to be construed to limit the scope of the invention.

EXAMPLE 1

Distillation of sea water was carried out by employing a thermal diffusion type vertical solar distillation apparatus in which a single reflective cooling plate is employed. That is to say, the employed apparatus was made up of a heat receiving plate to the back of which a porous water-absorptive sheet was stuck, a relative cooling plate to the back of which the porous sheet was stuck, a heat insulating frame, upper and lower tanks, a transparent double cover and a condensed water collecting gutter. A stainless steel plate having a thickness of 0.3 mm. was employed as the heat receiving plate and the reflective cooling plate, and a polyvinyl formal foam sheet (thickness: 1 mm., apparent specific gravity: 0.12 g/cm.$^3$, porosity: 91%) was employed as the porous sheet. The heat receiving plate had a black coating (absorption ratio: 97 to 98%, and the area of the heat receiving surface was 1.5 m.$^2$ (1.5 m. long and 1.0 m. broad). The surface of the cooling plate was smooth, and the reflectivity of the reflective surface was 90%. The area of the reflective surface was 1.4 m.$^2$ (1.4 m. long and 1.0 m. broad). A transparent sheet glass having a thickness of 3 mm. was employed as the covers.

The weather upon the distillation was fine, and the test was carried out under the following conditions: atmospheric temperature 23° to 27° C., relative humidity 72%, amount of solar radiation 598 kcal./m.$^2$·hour and wind velocity 2 to 4 m./sec. Sea water was supplied from a feed pipe to the upper tank with overflowing from an overflow pipe connected to the upper tank. Sea water which had run down through the porous sheets stuck to the heat receiving plate and the cooling plate and reached the lower tank was discharged from the lower tank. The temperature of the sea water which reached the lower tank through the porous sheet of the heat receiving plate was 69° C., and the temperature of the sea water which reached the lower tank through the porous sheet of the cooling plate was 40° C. The amount of the discharged sea water was 1.4 liters/hour.

The results are shown in Table 1, in which the heat efficiency is calculated by the following equation and hereinafter means the same.

$$\text{Heat efficiency} = \frac{\substack{\text{Amount of} \\ \text{produced dis-} \\ \text{tilled water} \\ \text{(kg./hr.)}} \times \substack{\text{Latent heat of} \\ \text{evaporation of} \\ \text{water} \\ \text{(560 kcal./kg.)}}}{\text{Amount of heat fed (kcal./hr.)}} \times 100$$

TABLE 1

| | |
|---|---|
| Temperature of heat receiving plate | 83° C. |
| Temperature of reflective cooling plate | 56° C. |
| Amount of produced distilled water | 1,131 ml./hour |
| Heat efficiency | 71% |

EXAMPLE 2

Distillation of sea water was carried out by employing a thermal diffusion type vertical solar distillation apparatus as shown in FIG. 1.

Stainless steel plates (thickness: 0.3 mm.) were employed as the heat receiving plate 1 and the reflective cooling plates 3, 5 and 7. The heat receiving plate 1 had a black coating (absorption ratio: 97 to 98%), and the heat receiving surface area was 1.5 m.$^2$ (1.5 m. long and 1.0 m. broad). The cooling plates 3, 5 and 7 had smooth surface (reflectivity: 90%), and the reflective surface area of each plate was 1.4 m.$^2$ (1.4 m. long and 1.0 m. broad). Polyvinyl formal foam sheets (thickness: 1.0 mm., apparent specific gravity: 0.12 g./cm.$^3$, porosity: 91%) were employed as the porous water-absorptive sheets 2, 4, 6 and 8. Also, transparent glass sheets (thickness: 3 mm.) were employed as the transparent covers 11 and 12.

The weather at the time of distillation was fine, and the test was carried out under the following conditions: atmospheric temperature 23° to 26° C., relative humidity 75%, amount of solar radiation 603 kcal./m.$^2$·hour and wind velocity 1 to 4 m./sec. Sea water was supplied from the feed pipe 20 to the upper tank 13 with overflowing from the overflow pipe 21. Sea waters which had run down through the porous sheets 2, 4, 6 and 8 and reached the lower tank 14 was discharged from the lower tank 14. The temperatures of the sea waters which reached the lower tank 14 through the porous sheets 2, 4, 6 and 8 were 83° C., 71° C., 54° C. and 42° C., respectively. The amount of the discharged sea water was 2.1 liters/hours.

The results are shown in Table 2.

TABLE 2

| | |
|---|---|
| Temperature: | |
| Heat receiving plate 1 | 97° C. |
| Reflective cooling plate 3 | 80° C. |
| Reflective cooling plate 5 | 64° C. |
| Reflective cooling plate 7 | 46° C. |
| Amount of distilled water produced: | |
| Between the plates 1 and 3 | 1,175 ml./hour |
| Between the plates 3 and 5 | 893 ml./hour |
| Between the plates 5 and 7 | 681 ml./hour |
| Total | 2,749 ml./hour |
| Heat efficiency | 170% |

EXAMPLE 3

Distillation of sea water was carried out by employing a thermal diffusion type inclined solar distillation apparatus as shown in FIG. 3.

Materials of the apparatus were the same as those of the vertical distillation apparatus employed in Example 2 except that the heat receiving surface area of the heat receiving plate 1 was 2.0 m.$^2$ (1.0 m. long and 2.0 m. broad) and the reflective surface area of each of the reflective cooling plates 3, 5 and 7 was 2.0 m.$^2$ (1.0 m. long and 2.0 m. broad).

The weather upon the distillation was fine, and the test was carried out under the following conditions: atmospheric temperature 19° to 25° C., relative humidity 78%, amount of solar radiation 595 kcal./m.$^2$·hour and wind velocity 1 to 3 m./sec. Sea water was supplied from the feed pipe 20a to the distributing porous water-absorptive thick sheet 30, and the sea water which had passed through the porous water-absorptive sheets 2, 4, 6 and 8 was collected by the recovering porous water-absorptive thick sheet 40 and was discharged through the pipes 22a and 22. The temperature of the sea waters at the lower ends of the porous sheets 2, 4, 6 and 8 were 86° C., 74° C., 58° C. and 43° C., respectively. The amount of the discharged sea water was 2.3 liters/hour.

The results are shown in Table 3.

TABLE 3

| | |
|---|---|
| Temperature: | |
| Heat receiving plate 1 | 98° C. |

TABLE 3-continued

| | |
|---|---|
| Reflective cooling plate 3 | 84° C. |
| Reflective cooling plate 5 | 66° C. |
| Reflective cooling plate 7 | 49° C. |
| Amount of distilled water produced: | |
| Between the plates 1 and 3 | 1,777 ml./hour |
| Between the plates 3 and 5 | 1,201 ml./hour |
| Between the plates 5 and 7 | 913 ml./hour |
| Total | 3,891 ml./hour |
| Heat efficiency | 183% |

EXAMPLE 4

Distillation of sea water was carried out by employing a convection type multi effect distillation apparatus as shown in FIG. 7, in which ten dish-like vessels made of 18-8 stainless steel having a size of 2,000 mm. in length, 500 mm. in width and 50 mm. in height were piled up horizontally. Each overflow pipe attached to the bottom of the vessel projected through the bottom to a height of 25 mm. A polyvinyl formal foam sheet (thickness: 1.0 mm., basis weight: 138 g./m.$^2$) was employed as the porous water-absorptive sheets stuck to the under surfaces of the bottoms of the vessels. The width of each slit opening in the vertical direction was 2.0 mm. Sea water was supplied to the top vessel, and was made to overflow through the overflow pipe of each vessel in order, and was discharged through the overflow pipe of the lowest vessel. The temperature of the concentrated sea water discharged from the lowest vessel was 96.8° C., and the amount of the discharged sea water was 12.0 liters/hour. The heating was conducted by an electric heater. The amount of heat fed was 856 kcal./hour.

The results are shown in Table 4.

TABLE 4

| | |
|---|---|
| Temperature of sea water: | |
| In the top vessel | 51.2° C. |
| In the 2nd vessel | 59.3° C. |
| In the 3rd vessel | 65.1° C. |
| In the 4th vessel | 70.0° C. |
| In the 5th vessel | 75.2° C. |
| In the 6th vessel | 79.5° C. |
| In the 7th vessel | 84.0° C. |
| In the 8th vessel | 88.5° C. |
| In the 9th vessel | 92.9° C. |
| In the lowest vessel | 96.8° C. |
| Amount of distilled water produced: | |
| At the top vessel | 0.30 liter/hour |
| At the 2nd vessel | 0.49 liter/hour |
| At the 3rd vessel | 0.67 liter/hour |
| At the 4th vessel | 0.83 liter/hour |
| At the 5th vessel | 0.94 liter/hour |
| At the 6th vessel | 1.05 liters/hour |
| At the 7th vessel | 1.26 liters/hour |
| At the 8th vessel | 1.52 liters/hour |
| At the 9th vessel | 1.63 liters/hour |
| At the lowest vessel | 1.73 liters/hour |
| Total | 10.42 liters/hour |
| Heat efficiency | 750% |

EXAMPLE 5

Distillation of sea water was carried out by employing a convection type solar distillation apparatus as shown in FIG. 9, in which eight dish-like vessels were horizontally piled up. The sizes and materials of the vessels and the porous water-absorptive sheets were the same as those in Example 4. The sunlight gathering box 70 was made of aluminum mirror plates, and had a parabolic bottom surface and flat side walls. Also, a solar heat absorptive coating (absorption ratio: 97 to 98%) applied to the under surface of the bottom of the lowest vessel was formed by employing a black coating composition containing an epoxy resin and carbon black. The amount of heat fed was 940 kcal./hour.

The results are shown in Table 5.

TABLE 5

| | |
|---|---|
| Temperature of sea water: | |
| In the top vessel | 67.8° C. |
| In the 2nd vessel | 72.0° C. |
| In the 3rd vessel | 76.1° C. |
| In the 4th vessel | 81.4° C. |
| In the 5th vessel | 86.0° C. |
| In the 6th vessel | 90.5° C. |
| In the 7th vessel | 94.6° C. |
| In the lowest vessel | 98.2° C. |
| Amount of distilled water produced: | |
| At the top vessel | 0.85 liter/hour |
| At the 2nd vessel | 0.89 liter/hour |
| At the 3rd vessel | 1.00 liter/hour |
| At the 4th vessel | 1.28 liters/hour |
| At the 5th vessel | 1.53 liters/hour |
| At the 6th vessel | 1.61 liters/hour |
| At the 7th vessel | 1.71 liters/hour |
| At the lowest vessel | 1.86 liters/hour |
| At the heat exchanger 60 | 0.75 liter/hour |
| Total | 11.48 liters/hour |
| Heat efficiency | 684% |

What we claim is:

1. A process for distilling water which comprises providing a mirror-like heat-reflective surface on one side of a plurality of cooling plates, heating one side of a heat receiving plate member, evaporating water to be treated which is held on the other side of said heat receiving plate member, condensing the resulting water vapor on the heat-reflective condensing surface of a cooling plate member which is the cooling plate member adjacent to said heat receiving plate member among a plurality of cooling plate members provided at a space to each other and in parallel with said heat receiving plate member, repeating the evaporation of water to be treated which is held on the opposite side of each cooling plate member to the condensing surface and the condensation of the resulting water vapor on the condensing surface of the next adjacent cooling plate member, said evaporation being caused by the latent heat of said condensation, and collecting the condensed water.

2. The process for distilling water of claim 1, wherein said heat receiving plate member and a plurality of said cooling plate members are arranged in that order in parallel spaced relationship with each other and have a porous water-absorptive sheet on each back side thereof to hold the water to be treated, said heat receiving plate member is heated by sunlight and the porous water-absorptive sheet attached to the back of the most outer cooling plate member among a plurality of the cooling plate members is cooled by the outside air.

3. The process for distilling water of claim 1, wherein said water to be treated is held in each of plural dish-like vessels piled up in stages and overflows in order from an upper vessel to the adjacent lower vessels, the under surface of the bottom of the lowest vessel is heated, the water vapor generated from a lower vessel is condensed on the under surface of the bottom of the adjacent upper vessel and while the water held in said adjacent upper vessel is evaporated by the latent heat of the condensation so that the heat given to the water held in the lowest vessel transfers to the water held in the top vessel in a contrary direction of the flow of the water to be treated and thereby the temperature of the water to be treated in each vessel is maintained in a stationary state.

* * * * *